United States Patent [19]

Tuckley et al.

[11] Patent Number: 4,690,412
[45] Date of Patent: Sep. 1, 1987

[54] STRIP STRUCTURE INTENDED FOR CLAMPING ON A FLANGE

[76] Inventors: Trevor R. Tuckley, 7 The Furrows, St. Ives, Cambridgeshire; Harold W. E. Pike, "Elm Lee", School Lane, Conington, Nr. Elsworth, Cambridgeshire, both of United Kingdom

[21] Appl. No.: 709,569

[22] Filed: Mar. 8, 1985

[51] Int. Cl.⁴ .......................... F16J 15/12; E06B 7/23
[52] U.S. Cl. ................................... 277/184; 277/205; 49/490; 296/93
[58] Field of Search ................... 277/184, 205, 206 R; 49/490, 491; 296/93

[56] References Cited
U.S. PATENT DOCUMENTS

| | | |
|---|---|---|
| 1,919,130 | 7/1933 | Reid . |
| 2,746,103 | 5/1956 | Bright . |
| 3,239,987 | 3/1966 | Lansing . |
| 3,638,359 | 2/1972 | Kruschwitz . |
| 3,688,460 | 9/1972 | Van Loghem et al. ............ 277/184 |
| 4,030,245 | 6/1977 | Yeomans . |
| 4,107,898 | 8/1978 | Andrzejewski et al. . |
| 4,114,320 | 9/1978 | Pullan . |
| 4,188,765 | 2/1980 | Jackson . |
| 4,232,081 | 11/1980 | Pullan . |
| 4,311,747 | 1/1982 | Kruschwitz ............ 49/490 |
| 4,318,249 | 3/1982 | Landreth . |
| 4,432,166 | 2/1984 | Weimar . |
| 4,470,223 | 9/1984 | Mesnel ............ 49/491 |

FOREIGN PATENT DOCUMENTS

| | | |
|---|---|---|
| 126233 | 12/1947 | Australia ............ 277/184 |
| 770399 | 10/1967 | Canada ............ 49/490 |
| 1076933 | 3/1960 | Fed. Rep. of Germany ........ 49/491 |
| 1414478 | 9/1965 | France ............ 277/205 |
| 1519307 | 2/1968 | France ............ 49/491 |
| 942698 | 1/1962 | United Kingdom . |
| 1010952 | 11/1965 | United Kingdom . |
| 1087471 | 10/1967 | United Kingdom . |
| 1103963 | 2/1968 | United Kingdom . |
| 1182244 | 2/1970 | United Kingdom . |
| 1496662 | 3/1975 | United Kingdom . |
| 1502543 | 1/1976 | United Kingdom . |
| 2058892 | 8/1980 | United Kingdom . |
| 1575515 | 9/1980 | United Kingdom . |

Primary Examiner—Robert S. Ward
Attorney, Agent, or Firm—Harness, Dickey & Pierce

[57] ABSTRACT

A strip structure intended for clamping on a flange has a channel defined by a base and two opposed side walls. At least one limb with a free depending end directed toward the base is positioned and secured on one of the side walls. An inward projection is also positioned on the side wall to which the limb is secured and adjacent to the limb. The limb has one face facing one side wall and another face facing the other side wall. The face facing the side wall to which the limb is secured has a recess therein which accommodates the projection on the side wall so that the strip structure can be attached onto a flange without undue force but strongly resists removal from the flange.

11 Claims, 3 Drawing Figures

STRIP STRUCTURE INTENDED FOR CLAMPING ON A FLANGE

This invention relates to a strip structure intended to be clamped securely on a flange or like member.

It is well known to provide channel-shaped strip structures intended to be clamped on a flange or like member. When used for clamping over a flange, such strip structures are often referred to as flange finishers.

Such strip structures have a channel defined by a base and two opposing side walls, which constitute a body which may be formed of a suitable rubber material or a suitable plastics material. To give any desired extra rigidity to the body it is conventional for a core to be embedded in the body, which core is usually formed of a metal.

With a view to resisting accidental removal of the strip structure from a flange, strip structures are usually provided on opposing side walls with inwardly directed limbs which act rather like a barb. Thus, when the strip structure is forced onto a flange, the limbs are caused to be deflected lateraly and to be moved slightly towards the base of the channel, but, when an attempt is made to remove the strip structure from the flange, the action of the limbs pressing on the flange and their general disposition tends to prevent such removal.

One conventional strip structure in production has four minor limbs projecting inwardly from one side wall of the strip structure and two major limbs projecting inwardly from the opposing side wall; such a typical channel-shaped strip structure has an internal width of approximately 6 mm. Various tests were run to find the force required to push the conventional strip structure onto a flange having a thickness of 1.5 mm. In three separate runs the forces required, over a sample having a length of 100 mm, were 24 Newtons, 30 Newtons and 30 Newtons, and the forces required to remove the same sample strip structure from the same flange were, respectively, 92 Newtons, 100 Newtons and 95 Newtons.

Similarly, when the same conventional strip structure was clamped on and then removed from a flange having an increased thickness of 2.5 mm, the forces during the clamping operation, over the 100 mm sample length, were 70 Newtons for all three samples, and the forces required for removal of the strip structure from the flange for the three runs were 165 Newtons, 178 Newtons and 170 Newtons.

Thus, it can be seen that the ratio of the force required to remove the strip structure from the flange to the force required to clamp the strip structure to the flange was about 3.5:1 in the case of the flange having a thickness of 1.5 mm, and about 2.4:1 in the case of the flange having a thickness of 2.5 mm.

In the tests on the conventional production strip structures, the strip structures were secured to flanges having a thickness of 1.5 or 2.5 mm, these being typical thicknesses, although occassionally thinner flanges are found in experience.

Strip structures can be formed from any suitable material, for example, polyvinylchloride or a so-called nitrile polyvinylchloride blend. The limbs, which are sometimes formed from a material having a different hardness to that of the rest of the body, are usually tactile to some extent and, when the strip structure is clamped on a flange, the limbs tend to adhere to some extent to the opposing faces of the flange so that, when a force is applied to the strip structure to remove it from the flange, the free end regions of the limbs have a marked tendency to remain in a fixed position relative to the flange, which can compel the remainder of the limbs to reverse or "roll" around the fixed position which can cause the channel to be forced into a wider configuration.

In view of the need to provide strip structures which can be fitted to flanges relatively easily and yet which are strongly resistant to accidental removal, some research has been carried out relating to different facets of the strip structure. This research was also occasioned by a particular motor manufacturer indicating that they wanted a strip structure which, over a 100 mm length, required no more than 75 Newtons to force the strip structure onto the flange and which could not be removed with a force of less than 200 Newtons; it became clear that certain modifications would need to be made to existing strip structures in order to satisfy these criteria.

According to a first aspect of the present invention, there is provided a strip structure intended for clamping engagement on a flange or like member, the strip structure having a channel defined by a base and two opposed side walls, each side wall being provided with an elongate limb directed inwardly and towards the base such that the limbs abut at their free end regions;

wherein that face of each limb which faces the corresponding face of the other limb is straight or substantially straight over a portion of the limb in the region of the free end;

wherein the side walls are also each provided with an inward projection nearer the base of the channel than the root of the limb; and wherein each of the limbs is provided on that face which faces the side wall with a recess in which the projection may be accommodated;

the arrangement being such that, in use, when the strip structure is being clamped on a flange or like member, the flange causes the limbs to be moved apart, with the projections being accommodated in the corresponding recesses, whereby the clamping may be effected without undue force, but, when an attempt is made to remove the strip structure from the flange, the free end regions of the limbs grip the flange and the limbs are restrained from undue movement towards the open end of the channel by the interaction of the projections and the limbs in the region of the recesses of the latter, the configuration of the limbs and the effect of said interaction being such that considerably more force is required to remove the strip structure from the flange than is required to clamp the strip structure on the flange.

According to a second aspect of the present invention, there is provided a strip structure intended for clamping engagement on a flange or like member, the strip structure having a channel defined by a base and two opposed side walls, each side wall being provided with an elongate limb directed inwardly and towards the base such that the limbs abut at their free end regions;

wherein that face of each limb which faces the corresponding face of the other limb is straight or substantially straight over a portion of the limb in the region of the free end; and wherein each limb has a length, as measured along the face which faces the corresponding face of the other limb, which exceeds the width of the channel at the point where the root of the limb projects from its respective side wall;

the arrangement being such that, in use, when the strip structure is being clamped on a flange or like member, the flange causes the limbs to be moved apart, whereby the clamping may be effected without undue force, but, when an attempt is made to remove the strip structure from the flange, the free end regions of the limbs grip the flange, and the width and configuration of the limbs are such that the limbs are restrained against being rolled with the flange along the channel and hence against undue movement towards the open end of the channel, whereby considerably more force is required to remove the strip structure from the flange than is required to clamp the strip structure on the flange.

According to a third aspect of the present invention, there is provided a strip structure intended for clamping engagement on a flange or like member, the strip structure having a channel defined by a base and two opposed side walls, each side wall being provided with an elongate limb directed inwardly and towards the base such that the limbs abut at their free end regions;

wherein that face of each limb which faces the corresponding face of the other limb is straight or substantially straight over a portion of the limb in the region of the free end; and wherein the limbs are formed, on at least those surface regions which face the opposing limb, from a polished plasticized polyvinylchloride material;

the arrangement being such that, in use, when the strip structure is being clamped on a flange or like member, the flange causes the limbs to be moved apart, whereby the clamping may be affected without undue force, but, when an attempt is made to remove the strip structure from the flange, the inwardly directed faces of the limbs grip the flange over a considerable length which, in conjunction with the polished plasticized polyvinylchloride nature of those faces, causes a firm grip on the flange, whereby considerably more force is required to remove the strip structure from the flange than is required to clamp the strip structure on the flange.

According to a fourth aspect of the present invention there is provided a strip structure in accordance with both the first and second aspects of the present invention.

According to a fifth aspect of the present invention, there is provided a strip structure in accordance with both the first and third aspects of the present invention.

According to a sixth aspect of the present invention, there is provided a strip structure in accordance with both the second and third aspects of the present invention.

According to a seventh aspect of the present invention, there is provided a strip structure in accordance with all of the first, second and third aspects of the present invention.

As with conventional strip structures which serve as flange finishers, the strip structure of the present invention can have, but do not need to have, a sealing element attached to the exterior of the body of the strip structure. Such an arrangement is often employed in the region of the doors of automobile bodies, with the strip structure being secured to a flange and the sealing element forming a suitable seal between the door and the door frame.

The strip structures according to the present invention can have any suitable body, and it is not necessary for the body to have a metal core, although this is nowadays conventional in practice as the core can resist any tendency of the two side walls defining the channel to move apart during an attempt to remove the strip structure from a flange.

In one embodiment of the first aspect of the present invention, the recess in each limb is rather large compared with the magnitude of the projection, and the free end region of the limb increases in thickness in the direction from the free end towards the root, so that a head portion, rather like half an arrowhead, is present in the free end region of the limb. It is that end of the arrowhead portion nearer the root which abuts the projection, when the strip structure is fitted to a flange and an attempt is made to remove the strip structure from the flange.

In such an arrangement the projections can each have a camming face so that, with the limbs adhering to the flange, any attempt to cause the flange to be removed tends to cause the limbs to be moved towards the open end of the channel but, when this happens, the camming action of the camming face of the projections urges the limbs even more tightly against the flange, thereby tending to increase the resistance to removal of the strip structure from the flange.

The body and the limbs of such a strip structure could be formed of a rubber material, such as a styrene butadiene rubber, and the body portion of the strip structure could have a hardness of 70 Shore, with the limbs having a hardness of 60 Shore. If desired, a sponge sealing element formed from, for instance, an ethylene/propylene/diene monomer terpolymer (EPDM) could be secured to the exterior of one side wall. Rather than form the body (including the limbs) from styrene butadiene rubber, the body together with any sealing element could be formed from the ethylene/propylene/diene monomer terpolymer.

Alternatively, if both the body and any sealing element were formed of rubber, the strip structure could be formed during a single extrusion operation.

In a second, preferred, embodiment of the first aspect of the present invention, the recesses in the limbs are smaller than those in the first embodiment, but again the projections have a camming surface so that, when the strip structure is fitted on a flange, with the long, straight edge regions of the limbs abutting opposite sides of the flange, any attempt to remove the strip structure from the flange causes regions of the limbs defining part of the recesses to abut the camming face of the projections, thereby tending to increase the resistance to the removal of the strip structure from the flange.

In practice, when it is expected that flanges having a thickness of 1.5 or 2.5 mm are to be fitted wtih the strip structure, the width of the limbs, other than in the region of the recesses, is preferaby such that the limbs and the flange occupy the great majority of the width of the channel. Although the projections certainly assist in encouraging the limbs to grip the flange more firmly, nonetheless even if the projections were very small, the magnitude and configuration of the limbs can be such that the limbs have a good gripping effect on the flange. Often the body, in which the metal core (when present) is embedded, is formed of a polyvinylchloride, or a nitrile polyvinylchloride blend, although many other different materials can be used to construct the body, including the limbs.

With regard to the second aspect of the present invention, it has been stated above that the length of the limbs, as measured in the manner indicated above, should exceed the width of the channel at the point of which the roots of the limbs are affixed to the side walls of the channel. Preferably the length of each limb to the width of the channel exceeds the ratio 1.1:1; more preferably the ratio of the length of the limb to the width of the channel exceeds the ratio 1.2:1, good results in particular being obtained when the ratio of the length of the limb to the width of the channel exceeds 1.3:1, or more preferably exceeds 1.4:1, even reaching approximately 1.5:1.

As regards the third aspect of the present invention, the polished plasticized polyvinylchloride material can exist as a surface region only of the limbs; alternatively, the whole or substantially the whole limb can be formed from this material. It is interesting to observe that even though good retention results are obtained with a strip structure in accordance with the first or second aspect of the present invention, the good results can be enhanced when the polished plasticized polyvinylchloride surface regions of the limbs are provided in accordance with the third aspect of the present invention.

It is to be appreciated that the remarks shown above in respect of the first aspect, the second aspect and the third aspect of the present invention apply regardless of whether the invention is constituted by the first, second or third aspect, respectively, or whether any one of those aspects is used in conjunction with one or two of the two other aspects, in other words, the remarks made in respect of the first, second and third aspects of the present invention also apply, where appropriate to the fourth, fifth, sixth and seventh aspects of the present invention.

For a better understanding of the present invention and to show how the same may be carried into effect, reference will now be made, by way of example, to the accompanying drawings in which.

Figure 1:
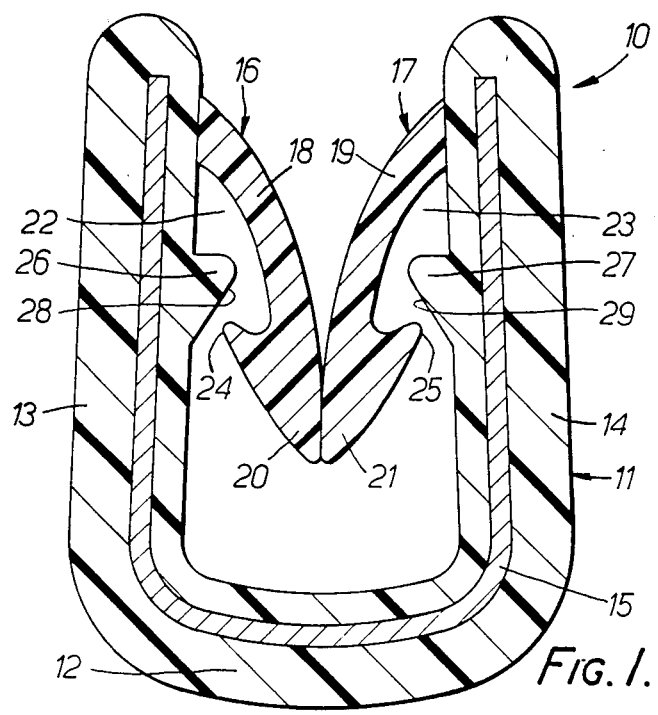
FIG. 1 is a cross-section through one embodiment of a strip structure in accordance with the present invention.

Referring first to FIG. 1, the strip structure generally indicated by the reference numeral 10 comprises a body generally indicated by the reference numeral 11 which has a base 12 and two almost parallel side walls 13, 14. Embedded in the body 11 is a metal reinforcing core 15. The body 11 is generally channel-shaped.

Projecting from the side walls 13, 14, inwardly and towards the base 12 are two limbs 16, 17, one from each side wall. The limbs 16, 17 have respective shank portions 18, 19 in those portions of their length nearer the point at which they are attached to the side walls 13, 14. The shank portions 18, 19 lead to respective head portions 20, 21 which abut each other. The shape of the shank portions 18, 19 and the head portions 20, 21 is such as to define recesses 22, 23, the head portions 20, 21 having barb-like portions 24, 25 directed towards the side walls 13, 14 respectively.

Also projecting from the side walls, 13, 14 inwardly into the interior of the channel are two projections 26, 27 one projection from each side wall. The projections 26, 27 have camming faces 28, 29 for the purpose indicated below.

When a flange (not shown) is to be fitted with a strip structure in accordance with FIG. 1, the flange is moved into the channel defined by the base 12 and side walls 13, 14 and, as the flange advances, it pushes aside the limbs 16, 17. This is possible because the projections 26, 27, are accommodated within the recesses 22, 23. Prior to the flange entering the channel, the head regions 20, 21 of the limbs 16, 17 abutted each other, and those faces of the shanks 18, 19 of the limbs 16, 17 which face each other were generally arcuate.

Now, with the flange inserted fully into the channel, the limbs 16 and 17 are forced apart and the head portions 20, 21 of the limbs 16, 17 abut and adhere to the flange. This is because the limbs 16, 17 are generally tactile.

When the flange is fully inserted in the channel, the barb-like portions 24, 25 of the head portions 20, 21 of the limbs 16, 17 are against or almost against the side walls 13, 14 of the strip structure and are near the narrower ends of the projections 26, 27.

As soon as any attempt is made to remove the strip structure 10 from the flange, then, in view of the tendency of the head portions 20, 21 to remain stationary with respect to the flange, it can be appreciated that any tendency of the limbs 16, 17 to be moved towards the open end of the channel causes the barb-like portions 24, 25 to abut the camming faces 28, 29 of the projections 26, 27 with the result that any such movement tends to cause the limbs 16, 17 to be urged inwardly and hence even more tightly against the flange, thereby increasing the resistance to removal of the flange.

Figure 2:
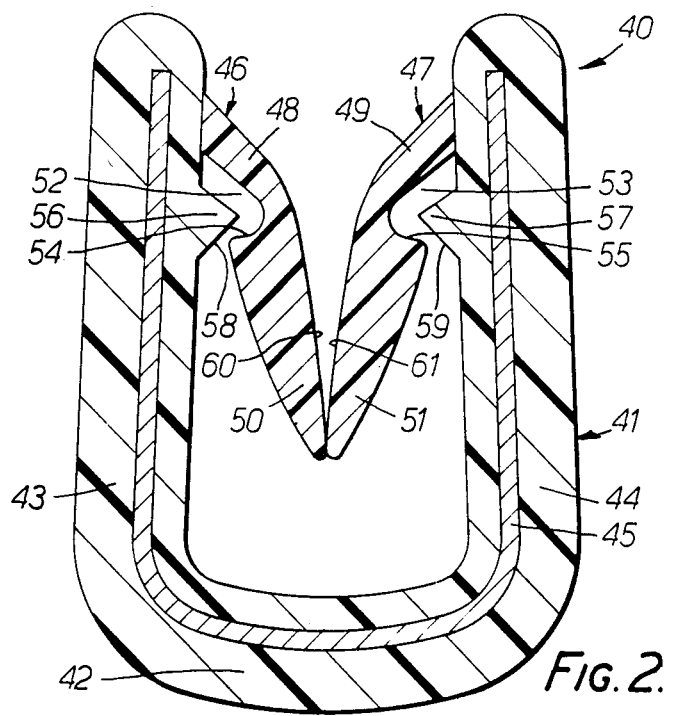
FIG. 2 is a cross-section through a second embodiment of strip structure in accordance with the present invention.

With regard now to the second embodiment illustrated in FIG. 2 of the drawings, the components indicated by the reference numerals 40 to 59 inclusive correspond in general terms and in function to the components of the strip structure shown in FIG. 1 and indicated by the reference numerals 10 to 29, respectively. By comparing FIG. 2 with FIG. 1 it can be seen that the projections 56, 57 are differently shaped from, and smaller than, the projections 26, 27 shown in FIG. 1; also, the shanks 48, 49 are shorter than the shanks 18, 19, and the head portions 50, 51 are longer than the head portions 20, 21, with the result that the recesses 52, 53 are generally smaller than the recesses 22, 23.

Another significant difference is that those faces 60, 61 of the head portions 50, 51 which face each other are straight or substantially straight over the length of the head portions 50, 51.

Figure 3:
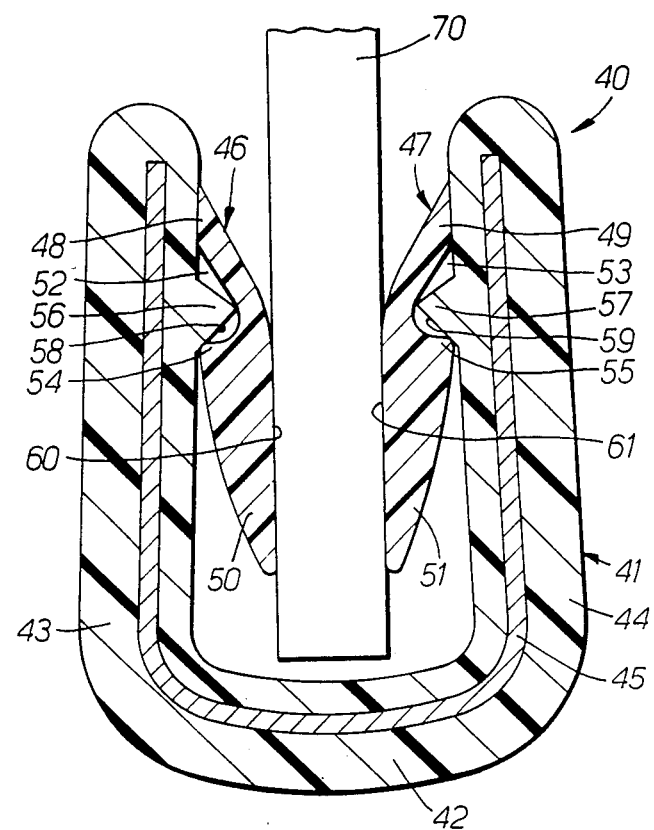
FIG. 3 is a cross-section of the strip structure of FIG. 2 clamped to a flange.

The strip structure 40 shown in FIG. 2 can be used in much the same way as the strip structure shown in FIG. 1, and the flange can be easily introduced into the channel but its removal therefrom is resisted for reasons similar to those which account for the resistance to the removal of the flange from the strip structure of FIG. 1. However, the longer head portions 50 and 51, plus the straight or almost straight faces 60, 61 give a large area of contact betewen the head portions 50, 51 and the flange, with a corresponding increase in resistance to removal of the strip structure from the flange. FIG. 3 shows a flange 70 fully inserted into the channel, with barb-like portions 54, 55 abutting the projections 56, 57.

Although the strip structures shown in FIGS. 1 and 2 can be formed of any suitable material, for example, a styrene butadiene rubber, or a polyvinylchloride, or an acrylo-nitrile polyvinylchloride blend, the performance of the strip structures can be enhanced, in the sense of increasing the resistance to removal of the strip structures from the flange, by forming at least the inwardly facing faces of the limbs 16, 17 (or 60, 61) of a polished, plasticized polyvinylchloride material, or by forming the whole of the limbs 16, 17 or 46, 47 of such material. It is well known how polyvinylchloride can be treated to make it polished, and in the present case, it has been found convenient, when the limbs 16, 17 or 46, 47 are formed of a plasticizd polyvinylchloride to effect extrusion of the limbs at a higher temperature than is normally employed. Here, it has to be appreciated that if too high a temperature is employed, the heat can have a detrimental effect on the quality of the polyvinylchloride. If, however, the temperature exceeds the normally lower, conventional, extrusion temperature, the polyvinylchloride produced can be readily plasticized and polished, and this is especially so when the polyvinylchloride is a clear polyvinylchloride.

The following Examples 1 to 4 illustrate the present invention. In each of the Examples, samples of strip structures, each 100 mm in length, were fitted over a flange which, in Example 1, had a thickness of 1.5 mm and, Examples 2, 3 and 4, a thickness of 2.5 mm. In all cases, the average width of the channel (excluding the limbs and inward projections) was 6.0 mm. In all cases, the forces required to fit the 100 mm length of strip structure onto the flange and then to remove the strip structure from the flange are expressed in Newtons (N).

EXAMPLE 1

Using a 100 m sample of the strip structure as shown in FIG. 2 of the accompanying drawings, provided with nitrile/polyvinylchloride blend limbs and using a flange 1.5 mm in thickness, the sample was fitted five times to the flange and the force required to fit the sample was 9N, 11N, 8N, 9N and 8N; in order to remove the same sample the forces required were 490N, 485N, 485N, 510N and 480N.

It can be seen that the average ratio of the force required to remove the strip structure from the flange to the force required to clamp the strip structure to the flange was of the order of 54.5:1.

EXAMPLE 2

The tests carried out in Example 1 were repeated, using the same sample of strip structure but this time clamping the strip structure to a flange having a thickness of 2.5 mm.

Six tests were conducted under these circumstances, and the forces required to fit the strip structure to the thicker flange were 31N, 29N, 27N, 35N, 37N and 39N, and the corresponding forces to remove the strip structure were respectively 570N, 515N, 440N, 400N, 782N and 580N. The large jump between the fourth and fifth readings of the forces to remove the strip structure from the flange is believed to be attributable to the fact that between the two readings the flange was cleaned again, to provide a smoother, more polished surface, which contrary to expectations permits the limbs of the strip structure to grip more firmly.

It can be seen that the average of the ratio of the forces required to apply the strip structure to the flange, to the forces required to remove the strip structure from the flange, was of the order of 16.6:1.

EXAMPLE 3

In this Example and the following Example 4, the strip structure had the base and side walls formed of 70-90 Shore black PVC whereas the limbs were formed of a clear, polished, plasticized polyvinylchloride compound VT 637 (Norsk Hydro). In Example 3, the strip structure had the configuration shown in FIG. 1, whereas in Example 4, the strip structure had the configuration shown in FIG. 2 of the accompanying drawings. In both of FIGS. 3 and 4, the strip structures were applied to a flange test piece having a thickness of 2.5 mm.

In Example 3, there were three test runs with the 100 m length sample which required forces of 20N, 25N and 30N to apply it to the flange but required forces of 550N, 435N and 410N to remove the strip structure from the flange. Thus, the ratio of the average of the forces required to remove the strip structure from the flange to the average of the forces required to apply the strip structure to the flange was of the order of 18.6:1.

EXAMPLE 4

Under the conditions specified for Example 4, as set out in Example 3 above, the 100 m length of sample of FIG. 2 configuration was tested, and over three runs a consistent force of 30N was required to apply the strip structure to the flange, whereas the forces required to move the sample over the three runs were 620N, 684N and 635N. Here it can be seen that the ratio of the force required to remove the strip structure from the flange to the force required to apply the strip structure to the flange has risen to about 21.5:1.

Although the limbs of the strip structures employed in Examples 3 and 4 were both formed of the polished plasticized polyvinylchloride, and although the other test conditions were the same, it is expected that, with the 2.5 mm flange, the improved results found in Example 4 were attributable to the relatively long, straight edges 60, 61 shown in FIG. 2, together with the more robust configuration of the limbs 46, 47 of the strip structure shown in FIG. 2 compared with the corresponding limbs 16, 17 of the strip structure shown in FIG. 1.

The foregoing Examples illustrate what results can be achieved by using the first and second aspects, or first, second and third aspects, of the present invention in conjunction with each other. Naturally, if less impressive ratios are required for certain applications, this can be achieved by reducing the length of the limbs, by making the opposing faces of the limbs more matt (i.e., less polished), or by making less of the opposing faces of the limb straight.

What is claimed is:

1. A strip structure intended for clamping engagement on a flange or like member, the strip structure having a channel defined by a base and two opposed side walls, each side wall being provided with an elongate limb having a free end region directed inwardly and towards the base such that the limbs abut at their free end regions;

wherein each limb has a pair of substantially straight faces in the region of the free end, one of said faces the corresponding face of the other said limb and the other of said faces generally facing the associated side wall;

wherein each side wall also is provided with an inward projection nearer the base of the channel than the root of the associated limb; and wherein each limb is provided on that face which generally faces the associated side wall with a recess in which the projection may be accommodated;

the arrangement being such that, in use, when the strip structure is being clamped on a flange or like member, the flange causes the limbs to be moved apart, with the projections being accommodated in the corresponding recess, whereby the clamping may be effected without undue force, but, when an attempt is made to remove the strip structure from the flange, the free end regions of the limbs grip the flange and the limbs are restrained from undue movement towards the open end of the channel by the interaction of the projections and the limbs in the region of the recesses of the latter, the configuration of the limbs and the effect of said interaction being such that considerably more force is required to remove the strip structure from the flange than is required to clamp the strip structure on the flange.

2. A strip structure according to claim 1, wherein the projections each have a camming face against which, when in use an attempt is made to remove the strip structure from the flange, an enlarged free end region of the limb abuts, in a manner such as to urge the free end region of the limb into harder contact with the flange.

3. A strip structure according to claim 1 which also includes a sealing element adjacent the exterior of one of the side walls.

4. A strip structure according to claim 1 which also includes a core embedded within the base and side walls of the strip structure.

5. A strip structure according to claim 1 wherein the base and two side walls comprise a material selected from the group consisting of polyvinylchloride, a nitrile polyvinylchloride blend, and a styrene butadiene rubber.

6. A strip structure according to claim 1 wherein the base and side walls have a Shore hardness of approximately 70 and the limbs have a Shore hardness of approximately 60.

7. A strip structure according to claim 1 which, when being fitted to and removed from a flange having a thickness of 2.5 mm, has a ratio exceeding 10:1 in respect of the ratio of the force required to remove the strip structure from the flange to the force required to push the strip structure onto the flange.

8. A strip structure including a channel defined by a base and two opposed side walls comprising:

at least one limb positioned and secured on either of said side walls, said limb having a free depending end being directed toward said base;

an inward projection positioned on said side wall adjacent to said limb securement;

said limb having a pair of faces, one of said faces positioned facing said side wall having said limb, the other face facing said side wall without said limb;

a recess on said face facing said side wall having said limb, said recess enabling accommodation of said projection in said recess;

wherein, in use, when the strip structure is being clamped on a flange or like member, the flange causes the limb to be moved such that the face facing the side wall having the limb moves towards that side wall, the projection being accommodated in the corresponding recess, whereby the clamping may be affected without undue force, but, when an attempt is made to remove the strip structure from the flange, the free depending end of the limb grips the flange and the limb is restrained from undue movement towards the open end of the channel by the inner action of the projection in the limb in the region of the recess of the ladder, the configuration of the limb and the affect of said interaction being such that considerably more force is required to remove the strip structure from the flange than is required to clamp the strip structure on the flange.

9. A strip structure according to claim 8 wherein the projection has a camming force against which, when in use, an attempt is made to remove the strip structure from the flange, an enlarged free end region of the limb abuts, in a manner such as to urge the free end region of the limb into harder contact with the flange.

10. A strip structure according to claim 8 wherein the said strip includes a sealing element adjacent the exterior of one of the side walls.

11. A strip structure according to claim 8 wherein said strip includes a core embedded within the base and side walls of the strip structure.

* * * * *

UNITED STATES PATENT AND TRADEMARK OFFICE
CERTIFICATE OF CORRECTION

PATENT NO. : 4,690,412
DATED : September 1, 1987
INVENTOR(S) : Trevor R. Tuckley, et. al.

It is certified that error appears in the above-indentified patent and that said Letters Patent is hereby corrected as shown below:

Col. 1, line 23, "lateraly" should be --laterally--
Col. 7, line 18, "readily" should be --suitably--
Col. 7, line 32, "100m" should be --100 mm--
Col. 8, lines 14-15, "100m" should be --100 mm--
Col. 8, line 26, "100 m" should be --100 mm--
Col. 8, line 65, claim 1, insert --facing--after faces second occurrence--
Col. 10, line 36, claim 9, "force should be --face--.

Signed and Sealed this

Twenty-first Day of December, 199

Attest:

BRUCE LEHMAN

Attesting Officer    Commissioner of Patents and Trademarks